United States Patent
Golinelli

(10) Patent No.: US 6,389,867 B2
(45) Date of Patent: May 21, 2002

(54) MACHINING PROCESS FOR A GAUGING OR MEASURING HEAD

(75) Inventor: Guido Golinelli, Bologna (IT)

(73) Assignee: Marposs, S.p.A., Bentivoglio BO (IT)

( * ) Notice: Subject to any disclaimer, the term of this patent is extended or adjusted under 35 U.S.C. 154(b) by 0 days.

(21) Appl. No.: 09/805,101

(22) Filed: Mar. 14, 2001

Related U.S. Application Data

(62) Division of application No. 09/297,817, filed as application No. PCT/EP97/06992 on Dec. 12, 1997, now Pat. No. 6,226,883.

(30) Foreign Application Priority Data

Dec. 20, 1996 (IT) .......................................... BO96A0674

(51) Int. Cl.⁷ .............................................. B21D 28/00
(52) U.S. Cl. ...................................... 72/341; 72/379.2
(58) Field of Search ............................. 72/377, 379.2, 72/341, 414; 29/896.9

(56) References Cited

U.S. PATENT DOCUMENTS

| | | | | |
|---|---|---|---|---|
| 1,402,392 A | * | 1/1922 | Bauer | 72/377 |
| 2,118,499 A | * | 5/1938 | Durbin | 72/379.2 |
| 3,389,902 A | * | 6/1968 | Young | 72/377 |
| 3,750,526 A | * | 8/1973 | Lerich | 85/79 |
| 3,826,009 A | | 7/1974 | Meier | |
| 3,847,015 A | | 11/1974 | Blatter | |
| 3,955,708 A | * | 5/1976 | Hulse | 220/269 |
| 4,356,634 A | | 11/1982 | Possati | |
| 4,409,737 A | | 10/1983 | Golinelli | |
| 4,555,855 A | | 12/1985 | Golinelli et al. | |
| 4,625,413 A | | 12/1986 | Possati et al. | |
| 5,883,556 A | * | 3/1999 | Shutes | 335/57 |
| 6,088,925 A | | 7/2000 | Montgomery et al. | |

FOREIGN PATENT DOCUMENTS

DE                    3330058            3/1984

* cited by examiner

Primary Examiner—Daniel C. Crane
(74) Attorney, Agent, or Firm—Dickstein Shapiro Morin & Oshinksky, LLP

(57) ABSTRACT

Gauging head and apparatus for linear dimension checking of mechanical pieces comprising an integral element that defines an arm carrying a feeler, a reference portion, and a fulcrum that enables rotations of the arm with respect to the reference portion, and a differential transformer position transducer with a cylindrical shaped casing, carrying windings, fixed to the reference portion, and a ferromagnetic core movable together with the arm. The integral element is locked in an adjustable way to a support by means of the cylindrical casing. The integral fulcrum is achieved by work hardening the material and subsequently grinding it.

3 Claims, 3 Drawing Sheets

US 6,389,867 B2

MACHINING PROCESS FOR A GAUGING OR MEASURING HEAD

This is a divisional of U.S. patent application Ser. No. 09/297,817 that was filed on May 10, 1999, now U.S. Pat. No. 6,226,883, which is a 371 of PCT/EP97/06992 filed Dec. 12, 1997, the entire disclosure of which is incorporated herein by reference.

TECHNICAL FIELD

The present invention relates to a gauging head suitable for coupling to a support for the linear dimension checking of a mechanical piece, comprising a shaped element defining a first reference portion, a second portion, or arm, movable with respect to the first, and an intermediate portion, or fulcrum, between the first and the second portion, that defines a geometric axis of reciprocal rotation between said first and second portion, a feeler fixed to said arm for contacting the piece to be checked, and a transducer device for providing signals responsive to the position of the feeler with respect to the reference portion, including two reciprocally movable parts, a first part thereof being stationary with respect to said first portion of the shaped element, and a second part being movable, together with said arm, with respect to the first portion.

The invention also relates to a checking apparatus for the linear dimension checking of a mechanical piece, comprising a support, a gauging head with a shaped element defining a first reference portion, stationary with respect to the support, a second portion, or arm, movable with respect to the first, and an intermediate portion, or fulcrum, between the first and the second portion, that defines an axis of reciprocal rotation between said first and second portion, a feeler fixed to said arm for contacting the piece to be checked, and a transducer device for providing signals responsive to the position of the feeler with respect to the reference portion, including two reciprocally movable parts, a first part thereof being stationary with respect to the first portion of the shaped element, and a second part being movable, together with said arm, with respect to the first portion, and a processing unit, electrically connected to the transducer device.

Furthermore, the invention relates to a process for machining the armset of a gauging, or measuring, head including an integral element that defines two reciprocally movable portions and a fulcrum between said portions.

BACKGROUND ART

There are known gauging heads for the geometric inspection of mechanical pieces that comprise a measuring arm with a feeler for contacting a piece to be checked, an element for supporting the arm, a fulcrum for allowing displacements of the arm with respect to the support element and a transducer for providing a signal responsive to the position of the arm with respect to the support element, in which the measuring arm, the support element and the fulcrum are formed from a single piece.

An example is provided in U.S. Pat. No. 4,409,737, that discloses gauging heads in which the support element comprises a wing, that extends in a direction perpendicular to the arm and enables the coupling -by means of screws- of the head to an external support. This type of coupling is quite lacking in versatility, in that, as the nominal dimensions of the piece to be checked vary, generally there is the need to replace the feeler and/or couple by means of screws the head in another area of the support or to another external support.

In order to guarantee the correct operation of the head, the coupling existing between the wing and the external support must be extremely accurate. This involves precision mechanical machinings of the surfaces intended to be arranged into mutual contact for defining the position of the head, and particular care in coupling the head to the external support.

Moreover, in the measuring heads disclosed in the US patent, the arrangement of the fulcrum, feeler and transducer is such that the feeler displacements occurring further to contact with the surface of the piece to be checked and the displacements among the reciprocally movable parts of the transducer substantially occur along two parallel straight lines, but at a certain distance from each other. Consequently, the entity of the displacement of the elements of the transducer differs from that of the corresponding displacement of the feeler and, in order to process the correct detecting, it is necessary to keep into account the so-called "arms-ratio", i.e. the ratio existing between the distance separating the transducer and the feeler from the axis of rotation defined by the fulcrum. It is understood how undesired displacements in the position of the axis of rotation of the arm (due to a not entirely accurate implementing of the integral fulcrum) and/or flexions of the arm may negatively affect the operation of the head, modify the ratio between the feeler and the transducer displacements with respect to the theoretical condition that considers an "arm ratio" evaluated on the basis of the head geometry.

The type of material utilized in the heads with armsets and so-called "integral" fulcra normally undergoes a hardening process for the purpose of increasing its ultimate tensile stress and thus its resilient range. This process, apart from being expensive, is subject to other drawbacks. In fact, when the material is ground for thinning it at the point where it is desired to achieve the fulcrum, especially if it is desired to attain a very thin fulcrum, there is the risk that the material may considerably heat up at the thinned point, and thus loose the effects that the hardening process had provided. The materials utilized for hardening must contain carbon and, owing to the fact that they are consequently oxidable, need a final treatment, like, for example, zinc plating.

It is absolutely necessary to employ particularly yielding, and thus very thin, fulcra when it is required to check pieces having limited stiffness that could deflect under a high measuring force, or pieces made of a soft material, that could get scratched.

Because of the need to accomplish precision mechanical machinings, hardening, grinding and subsequent antioxidant treatment, it is evident that these gauges are expensive and it is often difficult to attain particularly thin and yielding fulcra.

DISCLOSURE OF THE INVENTION

An object of the present invention is to provide an extremely accurate, versatile, simple to manufacture and inexpensive gauging head that overcomes the limitations of the known gauging heads.

It is another object of the invention to provide a gauging head that has a measuring force low enough to permit its use even for checking resilient pieces.

These and other objects are achieved by a gauging head comprising a shaped element including a first reference portion, a second arm portion movable with respect to the first reference portion, and an intermediate portion, or fulcrum, between the reference and arm portion, that defines a geometric axis of reciprocal rotation between said reference and arm portion, a feeler fixed to said arm portion for contacting the piece to be checked, and a transducer device for providing signals responsive to the position of the feeler with respect to the reference portion, including two reciprocally movable parts, a first part thereof being stationary with respect to said reference portion of the shaped element, and a second part being movable, together with said arm portion, with respect to the reference portion, wherein the first part of the transducer device comprises a casing having an elongate shape, locked to the reference portion and including a coupling surface, said casing being adapted for locking to the support at said coupling surface for defining the position of the gauging head with respect to the support.

Yet another object of the present invention is to provide a checking apparatus for checking the linear dimensions of mechanical pieces that, apart from guaranteeing considerable accuracy, is extremely simple and can rapidly and easily be adapted for checking pieces that have different nominal dimensions.

This and other objects are achieved by an apparatus comprising a support, a gauging head with a shaped element for defining a first reference portion, stationary with respect to the support, a second arm portion movable with respect to the first reference portion, and an intermediate portion, or fulcrum, between the reference and arm portion, that defines a geometric axis of reciprocal rotation between said reference and arm portion, a feeler fixed to said arm portion for contacting the piece to be checked, and a transducer device for providing signals responsive to the position of the feeler with respect to the reference portion, including two reciprocally movable parts, a first part thereof being stationary with respect to said reference portion of the shaped element, and a second part being movable, together with said arm portion, with respect to the reference portion, and a processing unit, electrically connected to the transducer device of the gauging head, wherein the first part of the transducer device comprises a casing with an elongate shape, and the support comprises an opening and a locking/unlocking device for housing said casing and adjusting the position of the gauging head with respect to the support.

A considerable advantage that a gauging head and a checking apparatus according to the invention provide is the utmost flexibility, that enables to employ as transducer devices, both known gauges of various types (axial-sliding or "cartridge" heads, dial type comparators, or others), and plain transducers (for example, Linear Variable Displacement Transducers, i.e. "LVDT" transducers) with windings and a ferromagnetic core coupled to the reciprocally movable parts of the armset, respectively. In this second case, an additional advantage that the heads according to the invention (and the apparatuses utilizing these heads) provide, is the friction free operation of the various moving, component parts.

An additional object that the invention provides is the attaining of an armset employed in gauging (or measuring) heads, that is extremely simple from a structural point of view, and can be manufactured by equally simple, rapid and economically convenient machinings.

This and other objects and advantages are achieved by a process including the steps of arranging a bar of metal material, and implementing a work hardening and a simultaneous reduction of the thickness of at least one area of the bar by compressing the area by means of a tool, thereby achieving a fulcrum and defining reciprocally movable portions.

BRIEF DESCRIPTION OF THE DRAWINGS

The invention is now described in more detail with reference to the enclosed sheets of drawings, given by way of non limiting example, wherein.

BEST MODE FOR CARRYING OUT THE INVENTION

Figure 1:
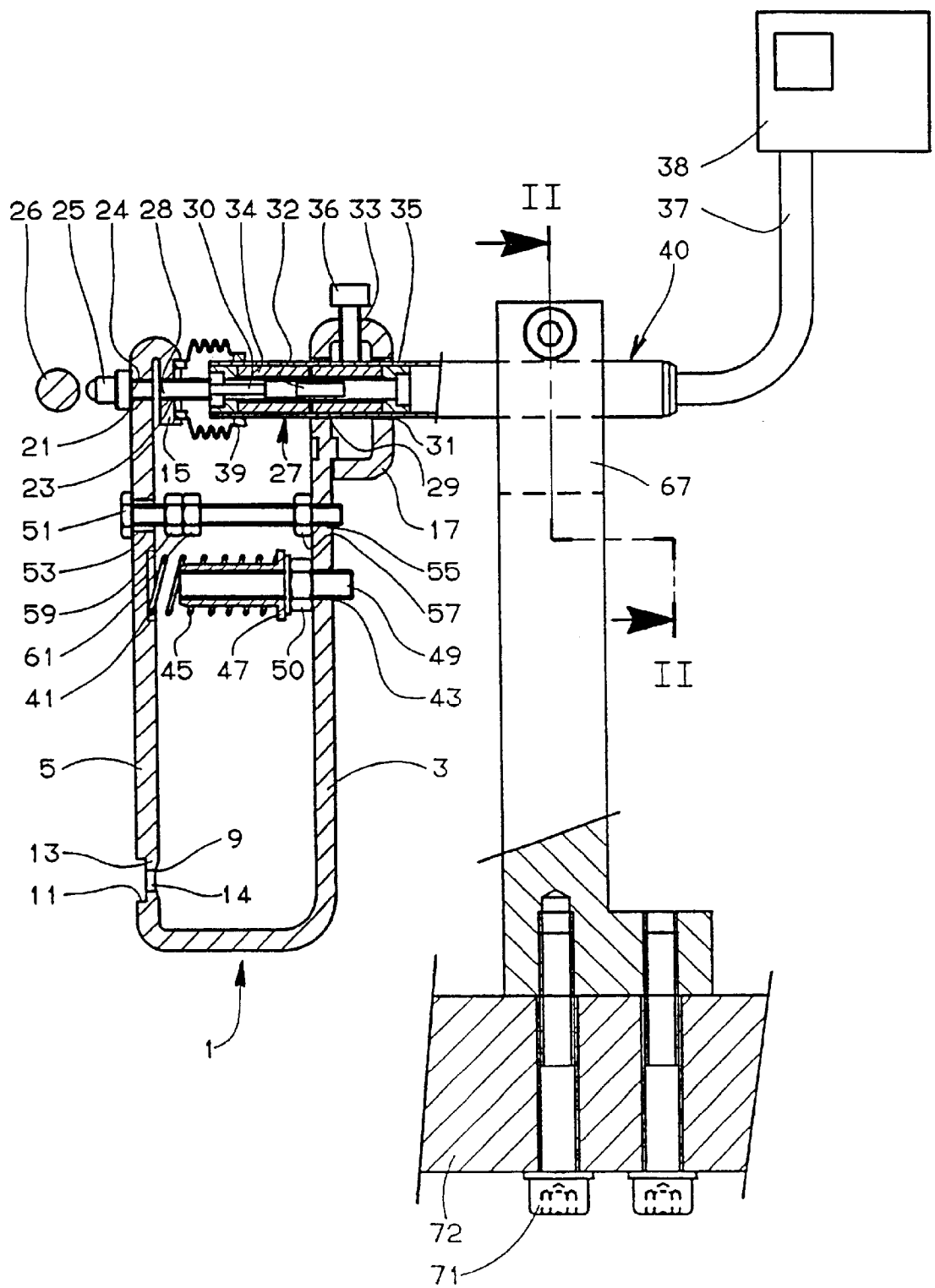
FIG. 1 is a partly cut-away longitudinal cross-sectional view of a checking apparatus comprising a gauging head according to the invention with some details shown in front view.
Figure 2:
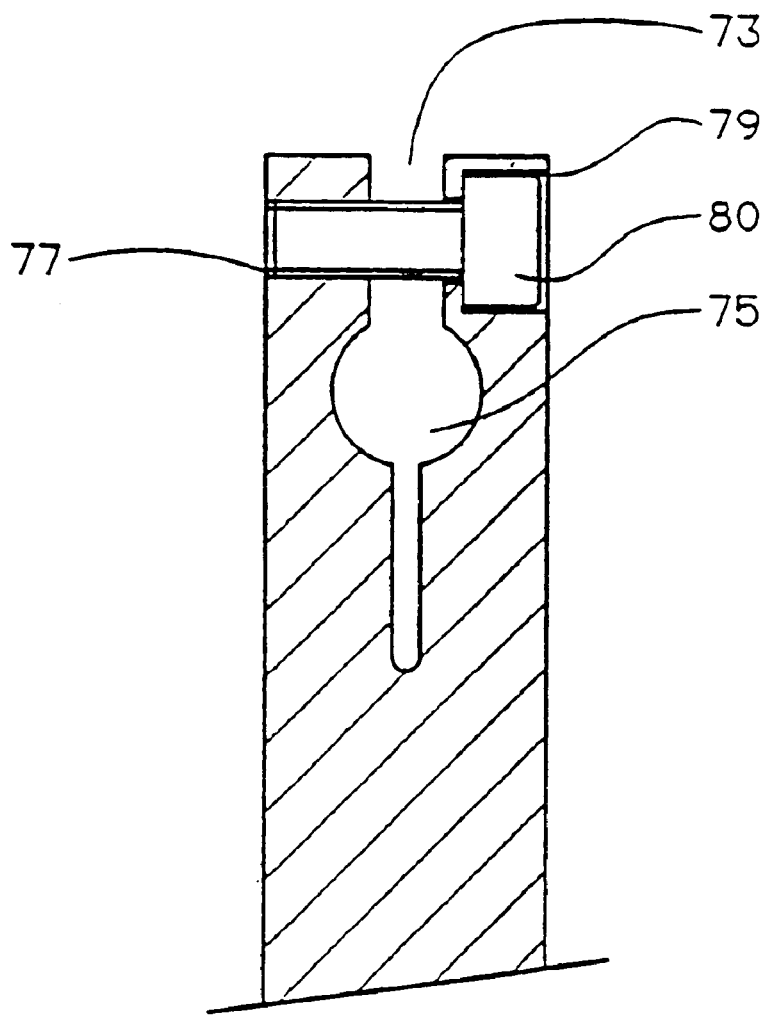
FIG. 2 is an enlarged scale sectional view of a detail of the head shown in FIG. 1, viewed along line II—II with some parts omitted for the sake of simplicity.

The checking apparatus shown in FIGS. 1 and 2 comprises a gauging head with an armset basically consisting of an integral, substantially U-shaped, element 1, formed, for example, from a single bar of stainless sheet-steel. The element 1 includes a first reference portion 3 that has a substantially rectangular cross-section and a second portion, or arm 5, also with a rectangular cross-section. The arm 5 and the reference portion 3 are formed by bending the stainless sheet-steel bar.

An intermediate portion 13, located between the arm 5 and the reference portion 3, has a round-shaped recess 9 and a squared groove 11, formed at two opposite sides of the sheet, at a same area, by compressing or drawing (for example, on a press) and grinding, respectively. In this way, the intermediate portion 13 has a transversal thickness that is reduced with respect to that of the other portions of element 1 and forms a fulcrum, in other terms it defines a geometric axis of rotation for the displacements of arm 5 with respect to the reference portion 3. Portion 13 also has a through hole 14 for increasing the compliance of the fulcrum.

The upper end of arm 5 has a bent portion 15.

The upper end of the reference portion 3 has a part 17 bent and withdrawn into itself.

On the bent portion 15 of arm 5 there are two threaded holes 21 and 23, aligned with respect to each other. A tang 24 of a feeler 25 for contacting a mechanical piece 26 to be checked is screwed in hole 21.

A transducer device comprises a linear variable displacement transducer 27 with a core 32 made of ferromagnetic material and windings 34 that house the core. In hole 23 there is screwed a pin 28 to which there is glued a stem 30 that carries the core 32 of the transducer 27.

On part 17 of reference portion 3 there is a threaded hole 33 and two through holes 29 and 31 aligned with respect to each other and the threaded holes 21 and 23.

The transducer 27 comprises a casing 35 with an elongate shape, For example a cylindrical shape, that houses the windings 34, and is housed in the opening defined by the two holes 29 and 31. Locking elements including a screw 36, that is screwed into the threaded hole 33, enable the casing 35 to be locked to the reference portion 3 in an adjustable way along a transversal geometric axis of adjustment defined by the casing 35 itself.

The windings 34 of the transducer 27 are electrically connected, by means of a cable 37, to a power supply, processing and display device, schematically shown and identified by reference number 38 in the figures.

A tubular sealing gasket 39, made of rubber, has an end coupled to arm 5 at the bent portion 15 and the other end coupled to the casing 35, so as to protect the transducer 27 from potential damage caused by foreign matter.

Arm 5 has a cylindrical seat 41 aligned with a threaded hole 43 located in reference portion 3.

Thrust devices between the arm 5 and the reference portion 3 of the shaped element 1 comprise a compression spring 45 with an end housed in the cylindrical seat 41 and the other end coupled to a bushing 47, internally threaded. A dowel 49 has an end screwed into the threaded hole 43 and the other end screwed into the interior of bushing 47. A nut 50 abuts against the surface of arm 5 for axially clamping dowel 49.

By operating bushing 47, it is possible to set the thrust of spring 45 between arm 5 and the reference portion 3. The rotations of arm 5 with respect to the reference portion 3 are limited, in a clockwise and counterclockwise direction (with reference to FIG. 1), by a mechanical limiting device comprising a screw 51 with a threaded stem that traverses a through hole 53 in arm 5 with a suitable amount of radial clearance and is screwed into a threaded hole 55 of the reference portion 3. On the stem of screw 51 there are screwed three nuts 57, 59 and 61. Nut 57 is urged against the reference portion 3 for preventing the accidental unscrewing of screw 51. Nut 59 has a base that defines an abutting surface for abutting against an internal surface of arm 5 for limiting the range of the rotational displacements of arm 5 in a clockwise direction (with reference to FIG. 1) and nut 61 is urged against nut 59 for axially locking nut 59 to the stem of screw 51. The rotational displacements of arm 5 in a clockwise direction (with reference to FIG. 1) are limited by contact occurring between the abutting surfaces of the head of screw 51 and the arm 5 itself.

Moreover, the checking apparatus shown in FIG. 1 includes a support 67 locked, by means of screws 71, to a base, schematically shown and identified by reference number 72. As shown in FIG. 2, in the upper part of the aforementioned support 67 there is an opening 73 for access to a substantially cylindrical hole 75 and two holes 77 and 79, one of the two —77—being threaded, aligned along a direction perpendicular to the axis of hole 75. The gauging head, more specifically the shaped element 1, is locked to support 67 by first inserting cable 37 through opening 73, by inserting the casing 35 in hole 75 and then locking the casing 35 in the required position, by narrowing opening 73. This is done by inserting a screw 80 into hole 79 and screwing it into threaded hole 77. The holes 75, 77 and 79 and screw 80 taken together form a locking/unlocking device that operates on a coupling surface 40, defined by the cylindric casing 35, for locking, in an adjustable way along the transversal geometric axis of adjustment, the position of the gauging head with respect to support 67.

The checking apparatus, for checking the diametral dimensions of a shaft 26, for example, operates in the following way.

Under rest conditions, the reciprocal position between arm 5 and reference portion 3 is defined by the arrangement of screw 51, and, more specifically, the contact-under the thrust of spring 45-between external surfaces of arm 5 and the reference surface of the head of the formerly mentioned screw 51.

By slackening nut 57 and operating screw 51, it is possible to set the formerly mentioned reciprocal position between arm 5 and reference portion 3, whereas by slackening nut 61 and operating nut 59, it is possible to vary the maximum amplitude of rotation of arm 5 commencing from the rest condition.

In a first zero-setting phase of the gauging head, the pre-stroke is defined, i.e. the distance that the feeler must travel, commencing from the rest condition, before it reaches zero position. In order to do this, the reciprocal position, under rest conditions, between core 32 and windings 34 of the transducer 27 is defined by operating the locking elements, more particularly by slackening screw 36 and adjusting the axial position of casing 35 until the display unit 38, that receives and processes the associated signals issued by transducer 27, indicates the required pre-stroke value, for example 300 μm. At this point, screw 36 is clamped onto the coupling surface 40 of casing 35 for setting the position of the latter on the integral element 1. The head is then coupled to support 67, by inserting the casing 35 in hole 75. A master piece, with a diameter size equal to the nominal one of the shafts to be checked, is positioned between reference supports, not shown in the figures, for example, Vee-shaped supports, stationary with respect to the base 72, in such a way that feeler 25 contacts the surface of the master piece in a diametral direction. Then, casing 35 is axially slid into hole 75 until, further to contact occurring between feeler 25 and the surface of the master piece and the feeler subsequently displacing of an entity equal to the previously defined pre-stroke, display unit 38 displays zero value. Then, the locking/unlocking device is operated, and, specifically, screw 80 is clamped onto the coupling surface 40 in order to lock casing 35, and thus the entire gauging head, to support 67 in the position that has been so determined. Upon completing the locking, possible limited deviations with respect to the value displayed by unit 38 are compensated by operating adjustment potentiometers of unit 38, per se known and not shown in the figures. At this point the apparatus is ready for checking and the master piece, that had been used during the zero-setting phase, is removed from the reference supports and replaced by the piece 26 to be checked.

Upon contact occurring between feeler 25 and the surface of piece 26, there occurs a rotational displacement of arm 5 in a clockwise direction (with reference to FIG. 1) starting from the rest condition. This displacement causes a variation in the position of core 32 with respect to the windings 34 of the transducer 27 and the latter provides an electric signal responsive to the deviation of the diameter size of the piece 26 taken into consideration for inspection, with respect to the diameter size of the master piece.

If the nominal dimensions of the piece vary (within a relatively broad range, that depends on the dimensions of the gauging head), the same checking apparatus and the same supports for the piece reference can still be used. This is effected by simply altering the position of the head with respect to support 67 by operating the locking/unlocking device (screw 80) and adjusting the axial arrangement of casing 35, by repeating zero-setting operations similar to those previously described.

The particularly "light" structure of the arm-set of the head, in addition to the absence of friction among the reciprocally movable elements of the transducer 27 ensures excellent performance at very low forces ("measuring forces") between feeler 25 and the surface of the piece to be checked. This allows, among other things, to employ the gauging head for checking poorly stiff pieces, in other terms in those cases in which a too high measuring force could deform the piece in the course of the measurement taking, and thus generate unreliable and non repeatable results.

A typical example is the flatness checking of a broad and flexible surface of the casing of an electronic apparatus in which it is necessary to utilize a plurality of heads for achieving accurate measurements. If each of these heads applies to the piece a substantial force, there may occur not only the piece deformation during the checking operations, but also that the deformation be irreversible. In order to reduce the layout dimensions of the electronic apparatus, often the amount of space between the casing and the circuit boards, housed therein, that carry the electronic components, is very small. Therefore, it is necessary to check the flatness of the casing surface, but it is also important not to deform the formerly mentioned surface in order to prevent the casing, once assembled, from contacting the electronic components on the boards. Gauging heads like the one illustrated in FIGS. 1 and 2 are, thus, particularly suitable for checkings of this type, especially thanks to the possibility of operating at low measuring forces.

Figure 3:
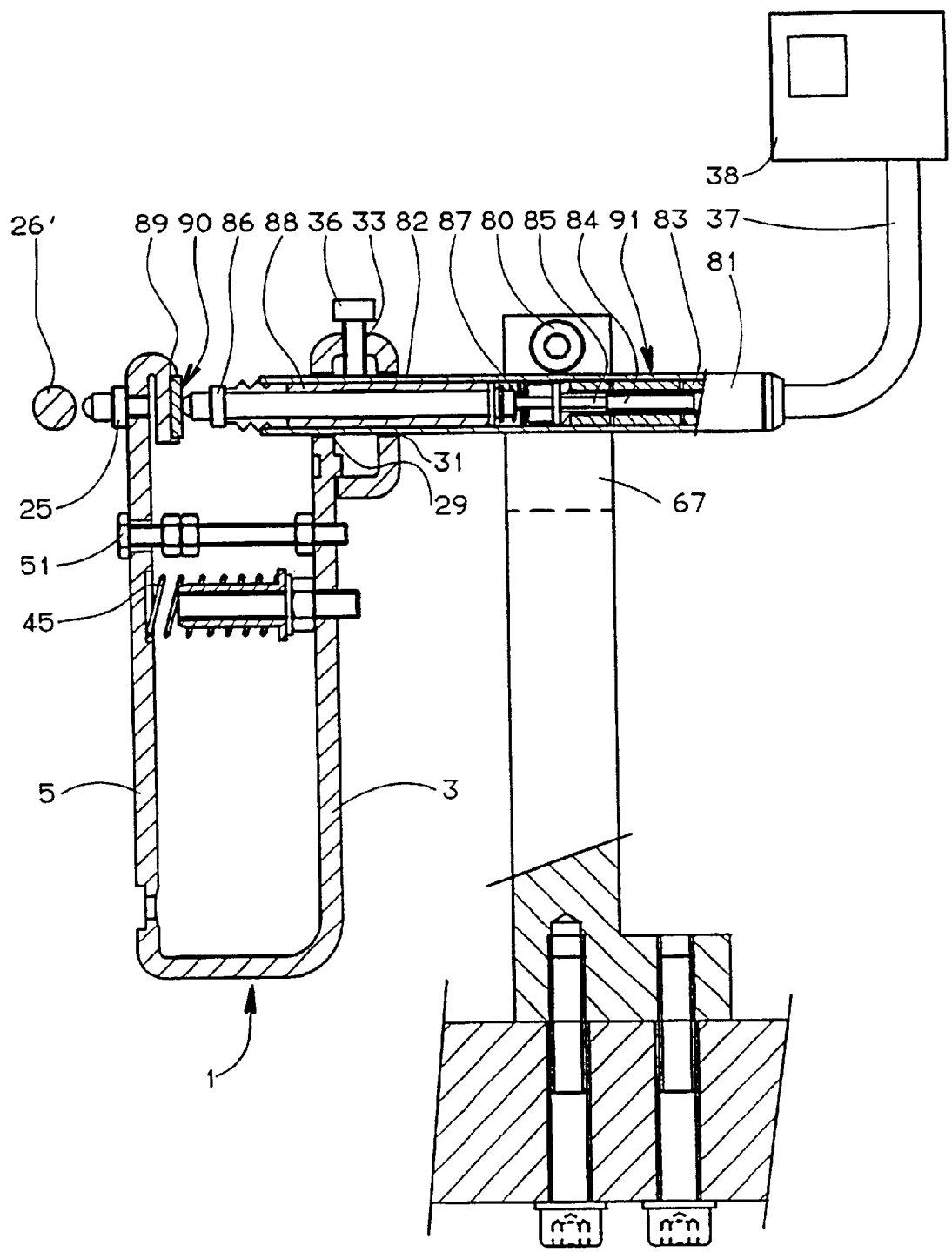
FIG. 3 is a partly cut-away longitudinal cross-sectional view, with some details shown in front view, of a gauging head according to another embodiment of the invention.

According to a second embodiment of the invention, illustrated in FIG. 3, there is a structure a great many coincident with that of FIG. 1, insofar as, among other things, the armset with the shaped element 1, the feeler 25, the mechanical limiting device 51, the compression spring 45, the locking elements with the screw 36, and the support 67 with the locking/unlocking device including screw 80 are concerned.

An axial-sliding linear gauge, for example, a cartridge head 81 of a per se known type comprises a substantially cylindrical-shaped casing 82, that houses the windings 83 and the ferromagnetic core 84 of a differential transformer transducer device, a stem 85, axially movable and partially housed in casing 82, that carries at one end an additional feeler 86 and at the other end the core 84, thrust means including an additional spring 87 that applies to stem 85 a thrust towards the exterior of casing 82, and guide means 88, housed in casing 82, for guiding the displacements of stem 85. The casing 82 of gauge 81 is housed in holes 29 and 31 in the reference portion 3 of element 1 and the axial position of the cartridge head 81 is determined, by the screw 36 that operates on a coupling surface 91 of casing 82, as described with regard to the casing 35 of the transducer 27 shown in FIG. 1. A reference abutment element 89 made of hardened material, locked to the threaded hole 23 of arm 5, comprises a flat surface 90 for remaining in contact with the additional feeler 86 of the cartridge head 81, as hereinafter described.

The shaped element 1 is locked to support 67 by inserting cable 37 through opening 73, by inserting the casing 82 in hole 75 and then locking the cartridge head 81 to support 67 in the required position by operating screw 80 to restrict the opening 73.

The functioning principle of the checking apparatus substantially coincides with what has been herein described with reference to FIGS. 1 and 2.

When a zero-setting operation on a master piece is performed, the prestroke of the gauging head is firstly defined by adjusting, under rest conditions, the position taken by casing 82 of the cartridge head 81 in the opening defined by holes 29 and 31. More specifically, the additional feeler 86 (integral with the ferromagnetic core 84) is brought into contact with the surface 90 of the reference abutment element 89, and the position of the casing 82 (integral with the windings 83) is further adjusted until the required pre-stroke value is displayed by unit 38. At this point, screw 36 is clamped onto the coupling surface 91 of casing 82 for locking the position of the latter on the integral element 1. Then, the gauging head is locked to support 67 by inserting casing 82 of the cartridge head 81 in hole 75 and adjusting its axial position until the feeler 25 contacts the surface of the piece to be measured and, subsequently to a displacement that represents the pre-stroke, the display unit 38 displays a "zero", value reading.

The master piece is removed and replaced with a piece 26' to be checked and the checking operation takes place in the manner hereinbefore described with reference to the first embodiment of the invention. In the course of the checking operations, the additional feeler 86 of gauge 81 always remains in contact —urged by the thrust of the additional spring 87—with the surface 90 of the reference abutment element 89 and consequently displaces integrally with arm 5, exactly in the same way as to what occurs, in the embodiment shown in FIG. 1, to pin 28 that carries, by means of stem 30, the core 32 of transducer 27. In this way, the additional feeler 86 and the stem 85 —rigidly coupled to the feeler—undergo just substantially axial strains, caused by the displacements of arm 5. Thus, those transversal strains that occur, for example, in known applications in which the feelers of cartridge heads directly contact pieces to be checked and expose the in ternal components of the gauge to undesired strains, are so avoided.

From the foregoing description, the versatility of the invention is evident. In fact, the same armset with the bent element 1 can be employed in gauging heads with a friction free transducer 27 (FIG. 1) enabling an extremely accurate measurement taking at very low measuring forces, or else in an axial-sliding linear gauge (FIG. 3) or a gauge of another type, as, for example, a dial type gauge, whenever similar devices are available and other requirements are necessary (as, for example, the need to prevent the armset of the linear gauge from undergoing any transversal strains), though maintain in both cases the same locking, positioning and zero-setting simplicity.

In fact, the housing defined by holes 29 and 31 and the associated locking elements are dimensioned and arranged so as to allow, as previously described, the simple and rapid locking of both the windings —housed in a suitable casing (35)—of a transducer (27) and "standard" size gauges. On the other hand, it is possible to couple —in an equally and obviously rapid and simple way—to the threaded hole 23 in arm 5, aligned with hole 21 that houses the feeler 25, either the pin 28 carrying stem 30 and core 32; or the reference abutment element 89 with the flat surface 90 for maintaining contact with the feeler of a gauge (for example, feeler 86 of the cartridge head 81).

Moreover, the manner according to which the head is locked to the support 67, besides providing flexibility and application simplicity advantages, as hereinbefore described, does not need extremely accurate mechanical machinings of the surfaces of the integral element 1, that do not affect in any way the positioning.

In addition to versatility, one of the main advantages that the invention provides is the simplicity and low costs for manufacturing the armset of the head, specifically insofar as the material utilized, the implemented structure, and the necessary operations are concerned. In fact, the shaped element 1 is formed by bending to a U shape a bar of stainless sheet-steel, and achieving the fulcrum by drawing, for example, by using a press for striking a blow to the sheet-steel bar, and subsequently grinding it. By drawing, there is obtained a work hardening of the material and hence an increase of the elastic range at the point where it is desired to implement the fulcrum. The part undergoing the drawing is then ground for the purpose of obtaining the recess that enables to further lighten the fulcrum and so provide lightness and low measuring force, typical characteristics of the head.

Moreover, as the material utilized does not have to undergo a hardening process beforehand, no subsequent antioxidant treatments of the head a set are necessary, and the material is substantially insensitive, even in the case of very thin and yielding fulcra, to the negative effects that the heating generated by the subsequent grinding operation might have on the ultimate tensile stress of the material (tempering).

A further advantage that the heads herein described and illustrated provide is a specific high degree of precision and accuracy, thanks to the aligning between the straight line according to which the feeler 25 substantially displaces and the one along which reciprocal displacement among the parts of the transducer device (32,34;83,84) takes place.

Indeed, this allows the observance of the Abbe principle—whereby in order to measure a length and benefit by all the measurement accuracy of the gauging instrument, it is necessary to arrange the formerly mentioned length along the detecting, or transduction axis. Furthermore, as it is not necessary to keep into account specific "arm ratios", the processing operations in unit 38 are simplified and the detecting is substantially insensitive to inaccuracies upon defining the rotation axis by fulcrum 13 and to flexions of arm 5.

It is possible to modify the herein described head and checking apparatus according to the present invention, without departing from the scope of the invention. For example, it is possible to manufacture the limiting and/or thrust devices in a known way, that differs from what has been described, or arrange them in another way.

In particular applications it is also possible to employ a feeler off-set with respect to the point where it is coupled to the arm. The shaped element can be manufactured by employing a material different from the stainless sheet-steel and the hardening process can be attained by following known processes that differ from the drawing process.

It is possible to employ even capacitive, or inductive type, transducer devices, manufactured in a different way from the one herein described.

Furthermore, by means of a machining process according to the present invention, it is possible to manufacture an armset with an integral element similar to the one illustrated and described, suitable for applications differing from those illustrated and that can be employed, for example, in absolute measuring heads.

Moreover, the herein described process for manufacturing the fulcrum also applies to the machining of armsets that have other shapes, as, for example, arm-sets with a plurality of fulcra and a so-called "parallelogram" type structure.

What is claimed is:

1. A process for machining the armset of a gauging, or measuring, head including an integral element that defines two reciprocally movable portions and a fulcrum between said portions, including the following sequence of steps:

arranging a bar of metal material, implementing a work hardening of at least an area of said bar by compression by means of a tool, and reducing the thickness of the bar at said area by grinding, for achieving said fulcrum and defining said reciprocally movable portions of the integral element.

2. The process according to claim 1, wherein the bar undergoes drawing on a press, for achieving the work hardening of said area.

3. The process according to claim 1, comprising additional operations for bending the bar in order to attribute a substantially U-shape to said integral element.

* * * * *